(12) United States Patent
Achanta

(10) Patent No.: US 11,488,326 B2
(45) Date of Patent: Nov. 1, 2022

(54) ESTIMATION OF BISPHENOL A USING IMAGE ANALYSIS

(71) Applicant: Ananya Achanta, Hyderabad (IN)

(72) Inventor: Ananya Achanta, Hyderabad (IN)

(73) Assignee: Ananya Achanta, Hyderabad (IN)

( * ) Notice: Subject to any disclaimer, the term of this patent is extended or adjusted under 35 U.S.C. 154(b) by 395 days.

(21) Appl. No.: 16/801,179

(22) Filed: Feb. 26, 2020

(65) Prior Publication Data

US 2021/0183106 A1 Jun. 17, 2021

(30) Foreign Application Priority Data

Dec. 11, 2019 (IN) .............................. 201941051396

(51) Int. Cl.
*G06T 7/90* (2017.01)
*G06N 20/00* (2019.01)
*G01N 21/78* (2006.01)

(52) U.S. Cl.
CPC ................ *G06T 7/90* (2017.01); *G01N 21/78* (2013.01); *G06N 20/00* (2019.01)

(58) Field of Classification Search
None
See application file for complete search history.

(56) References Cited

U.S. PATENT DOCUMENTS

| 6,333,199 | B1 | 12/2001 | Nohta et al. |
| 9,206,459 | B2 | 12/2015 | Oguchi |
| 2013/0034908 | A1 | 2/2013 | Barstis et al. |
| 2013/0063606 | A1* | 3/2013 | McClay ................. H04N 17/04 348/181 |

FOREIGN PATENT DOCUMENTS

EP 3192881 B1 4/2017

OTHER PUBLICATIONS

Park et al. ("Paper-based Microfluidic Device for Bisphenol A Based Chemical Reaction and Image Analysis", BioChip J.(2016) 10(1): 25-33 DOI 10.1007/s13206-016-0104-0 "Park") (Year: 2016).*
Hyung-Geun Park et al., Paper-based microfluidic device for bisphenol A based chemical reaction and image analysis, BioChip Journal, 2016, vol. 10, pp. 25-33.
Katherine E. McCracken et al., Smartphone-based fluorescence detection of bisphenol A from water samples, RSC Advances, 2017, vol. 7, pp. 9237-9243.

* cited by examiner

*Primary Examiner* — Tapas Mazumder
(74) *Attorney, Agent, or Firm* — Harita S. Achanta

(57) ABSTRACT

A method for the estimation of trace amounts of Bisphenol A (BPA) in accordance with the present invention comprises reacting a sample containing BPA with a filter paper strip soaked in ferric agent(s), using an image processing software for measuring the mean Red, Green, and Blue (RGB) values, and calculating the amount of BPA using the algorithm in an open-source machine learning and data mining tool.

3 Claims, 2 Drawing Sheets

ESTIMATION OF BISPHENOL A USING IMAGE ANALYSIS

CROSS-REFERENCE TO RELATED APPLICATIONS

This application claims priority to application number 201941051396, filed in India on Dec. 11, 2019. The contents of the foregoing applications are incorporated herein by reference.

BACKGROUND OF THE INVENTION

1. Field of the Invention

The present invention relates to a method of estimating Bisphenol A using an image analyzer and a data mining tool.

2. Background Art

Bisphenol A or BPA, is found in polycarbonate plastics and epoxy resins. Polycarbonate plastics are often used in containers that store food and beverages such as water bottles. Some dental sealants and composites also may contain BPA. Research has shown that BPA can seep into food or beverages from containers that are coated with BPA. BPA is an endocrine disruptor that mimics the hormone "estrogen". It binds to estrogen receptors in the human body potentially causing cancer, behavioural problems in children, and if a mother consumes it, may lead to developmental delays in the foetus. Additional research suggests a possible link between BPA and increased blood pressure.

Conventional methods of BPA analysis include techniques such as gas chromatography/mass spectrometry (GC/MS), liquid chromatography/mass spectrometry (LC/MS), and LC/fluorescence spectroscopy. These techniques are highly sensitive and are capable of analyzing trace levels of BPA, even upto ppb levels. However, they are too expensive and impossible to be used for on-site testing. Thus, there exists a need to develop a test method that is simple, quick, efficient, accurate and cost-effective for the detection and estimation of low levels of BPA.

U.S. Pat. No. 6,333,199B1 discloses a method of analyzing Bisphenols comprising several steps which include reacting said Bisphenol with a labeling reagent having a pyrene group, so as to generate a fluorescent derivative, irradiating said fluorescent derivative with excitation light and detecting the emitted fluorescence, and calculating the amount of Bisphenol based on the intensity of detected fluorescence with reference to a calibration sample. However, this method requires a fluorescence spectrophotometer which is expensive.

EP3192881B1 discloses a method for detecting Bisphenol A using aptamers. The method comprises the steps of (a) adding a sample containing Bisphenol A, and a second aptamer binding specifically to the target material (Bisphenol A), and having a label attached to a first aptamer immobilized on a solid phase and binding specifically to Bisphenol A, to form a mixture, and incubating the mixture, wherein the first or second aptamer is selected from aptamers represented by nucleic acid sequences of SEQ ID NOs: 2 to 28; and (b) analyzing the label to detect the target material, Bisphenol. However, this method is tedious and expensive, involving specialized techniques such as immobilization of aptamers.

U.S. Pat. No. 9,206,459B2 discloses devices and methods for removing BPA and/or monitoring BPA concentration in contaminated water. The said devices include an enzyme electrode comprising selected enzymes that are capable of degrading BPA at an enhanced rate in response to an applied voltage. The electrodes can also be used to monitor BPA concentration in contaminated water by measuring the current flow through the electrode in response to an applied voltage. However, this method involves a complex step of selecting the specific enzyme that could react with BPA, is expensive, and not fit for in situ measurements.

US20130034908A1 discloses user-friendly Paper Analytical Devices (PADs) for the detection of chemical components indicative of a low quality pharmaceutical product. The pharmaceutical product to be analyzed is disposed upon the assay regions associated with the porous, hydrophilic medium, by swiping the pharmaceutical product across the device. This causes a colour change that can be analyzed to detect the presence or absence of the chemical components in the pharmaceutical product. This method further comprises automating the colour analysis by capturing an image of the device using a camera device; and providing image analysis software capable of recognizing and quantifying a colour change within the assay regions of the device that is shown in the captured image. Also, the said method further comprises an image analysis software on the camera device for processing the captured image in situ, or on a network server to process the captured image by sending the image to the network server that performs the analysis and transmits detected results back to the camera device. However, this prior art discloses the use of image analysis software that identifies only the intensity and no further quantification is done.

Hyung-Geun Park et al. reported methods of reacting phenol and ferric reagents on a paper-based microfluidic device. The paper-based microfluidic device is analyzed using a UV spectrophotometer. However, this invention requires an advanced paper device that is formed based on hydrophilic and hydrophobic barriers using a wax printing technique.

Katherine E. McCracken et al. evaluated a standalone smartphone-based fluorescence sensing method for identifying BPA present in water samples. In this technology, two smartphones were used as standalone Fluorescence sensors, with the LED flash serving as an excitation source, and the rear camera complementary metal-oxide-semiconductor (CMOS) sensor functioning as a fluorescence detector. BPA was quantified through both standard fluorescence spectroscopy and smartphone detection. However, this method requires an expensive customizable smartphone that can accommodate a fluorescence detector.

Hence, there is a strong need to develop a simple, low-cost, efficient, in situ method for the quantitative estimation of Bisphenol A. To overcome some or all of the aforementioned disadvantages, the present invention incorporates image analysis and a data mining tool to achieve the desired objective.

SUMMARY OF THE INVENTION

The present invention deals with the development of a novel, simple, low-cost, efficient, in situ method for the quantitative estimation of Bisphenol A. The present invention comprises of a simple method wherein Bisphenol A reacts with ferric agent(s) to form Red, Green, Blue (RGB) colours, the intensity of which is measured using a Java based image processing software called Image J, and calculating the levels of Bisphenol A using Orange, an open source data mining tool.

BRIEF DESCRIPTION OF THE DRAWINGS

The particular features and advantages of the invention as well as other objects will become apparent from the following description taken in connection with the accompanying drawings in which.

DETAILED DESCRIPTION OF THE INVENTION

Figure 1:
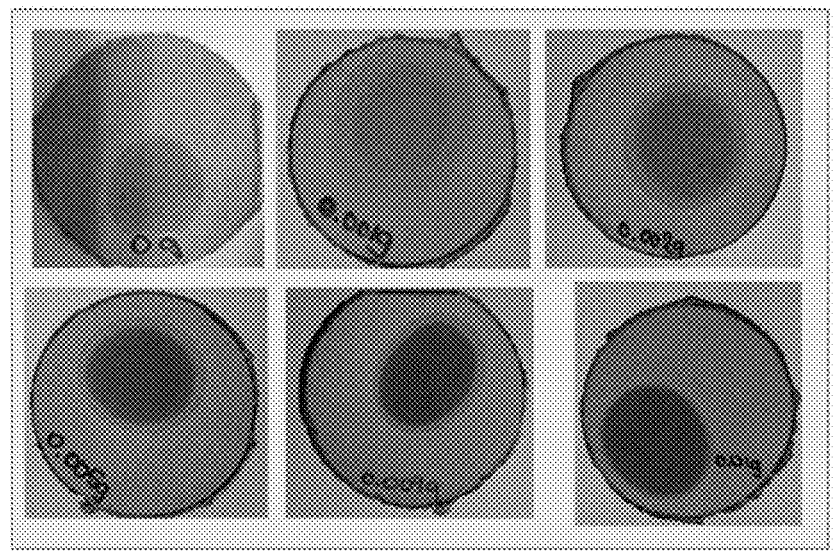
FIG. 1 is a photographic image of a filter paper wetted with Potassium Ferricyanide and Ferric Chloride changing colour in the presence of a) 0.0 g, b) 0.001 g, c) 0.002 g, d) 0.005 g, e) 0.009 g, and f) 0.01 g of BPA.

Unless defined otherwise, all technical and scientific terms used herein have the same meanings as commonly understood by one skilled in the art to which the current disclosure belongs.

Various embodiments will now be described to provide an overall understanding of the principle of the method disclosed herein. One or more examples of these embodiments are illustrated in the accompanying drawings.

The accompanying drawings, which are included to provide a further understanding of the invention and are incorporated in and constitute a part of this specification, illustrate the embodiments of the present invention, and together with the description serve to explain the principles of the invention.

The present invention is a simple and cost-effective method for the estimation of the levels of Bisphenol A in aqueous samples.

According to an embodiment of the present invention, the estimation of Bisphenol A in aqueous samples comprises of reacting the sample comprising Bisphenol A with ferric agent(s) to obtain a colour pertaining to the RGB colour intensity which is measured using Image J software—a Java based image processing software, followed by the calculation of the levels of Bisphenol A using Orange—an open source data mining tool.

According to an embodiment of the present invention, the method of estimating BPA comprises the steps of:
i) preparing calibration solutions by mixing the known amounts of BPA in equal quantities of water and acetone;
ii) preparing an aqueous solution of ferric agent(s);
iii) dipping a filter paper in the aqueous solution and allowing it to dry;
iv) cutting the filter paper into smaller pieces;
v) adding a drop of the BPA calibration samples to the filter paper;
vi) allowing the filter paper to stand for two minutes;
vii) capturing the image of the filter paper using a mobile phone, cropping it to a dimension of 50 pixels×50 pixels,
viii) uploading the cropped image onto an image processing software available on the mobile phone;
ix) processing the uploaded image to obtain the mean Red, Green and Blue (RGB) values of each image; and
x) obtaining the correlation between the mean RGB values and concentration of BPA, using a data mining tool.

The ferric agent(s) according to the embodiments of the present invention are selected from the group comprising of potassium ferricyanide, ferric chloride, ferric nitrate, and combinations thereof.

According to a preferred embodiment of the invention, the aqueous solution comprising ferric agent(s) is a solution of a mixture of potassium ferricyanide and ferric chloride.

The said image processing software according to the embodiments of the present invention is a Java based image processing software—Image J.

The said data mining tool according to the embodiments of the present invention is Orange. In particular, the Principal Component Analysis (PCA) feature of Orange was used to obtain the correlation between the mean RGB values and concentration of BPA.

The formula (Formula 1) employed for the calculation of RGB ratios was: Red, Green, Blue (RGB) Ratio= $(0.679 * R_{Mean}) + (0.644 * G_{Mean}) + (-0.353 * B_{Mean})$, wherein $R_{Mean}$, $G_{Mean}$ and $B_{Mean}$ stand for $Red_{Mean}$, $Green_{Mean}$ and $Blue_{Mean}$ respectively.

The values obtained from Orange were used to generate a calibration plot which in turn was used to identify the concentrations of BPA. This tool is also effective in estimating the concentrations of BPA when they are not known.

The embodiments of the present invention are detailed considering sample ferric agent(s) and concentrations of BPA for illustrative purpose only and are not to be considered as a limitation to the scope of the invention.

FIG. 1 shows the Potassium Ferricyanide and Ferric Chloride strip changing colour in the presence of various concentrations of Bisphenol A (BPA). The concentrations of Bisphenol A presented in this figure are 0.001 g, 0.002 g, 0.005 g, 0.009 g, and 0.01 g. As can be seen in the figure, though the concentrations of BPA are low, the colour intensity is proportionate to the concentration of BPA present in the sample.

Figure 2A:
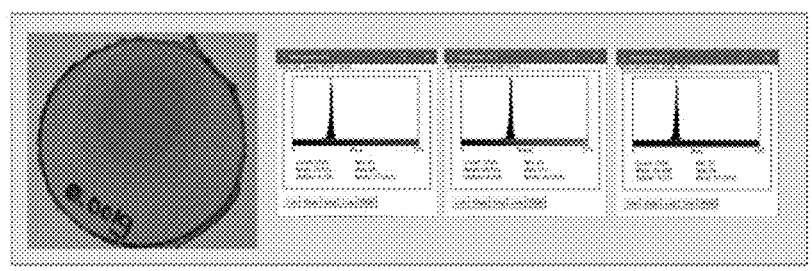
FIG. 2a represents the corresponding RGB values analyzed using Image J software for samples comprising 0.001 g of BPA.
Figure 2B:
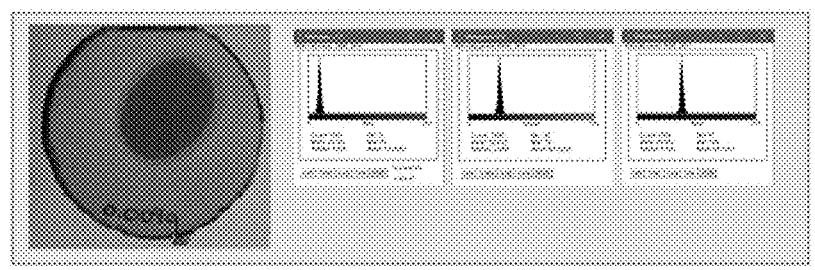
FIG. 2b represents the corresponding RGB values analyzed using Image J software for samples comprising 0.009 g of BPA.

FIG. 2a shows the Potassium Ferricyanide and Ferric Chloride strip changing colour in the presence of 0.001 g of Bisphenol A (BPA) while FIG. 2b shows the Potassium Ferricyanide and Ferric Chloride strip changing colour in the presence of 0.009 g of Bisphenol A (BPA). FIGS. 2a and 2b also show the output received from Image J when the values for the "Red", "Green" and "Blue" colors are processed for the samples comprising Bisphenol A in concentrations of 0.001 g and 0.009 g respectively.

Figure 3:
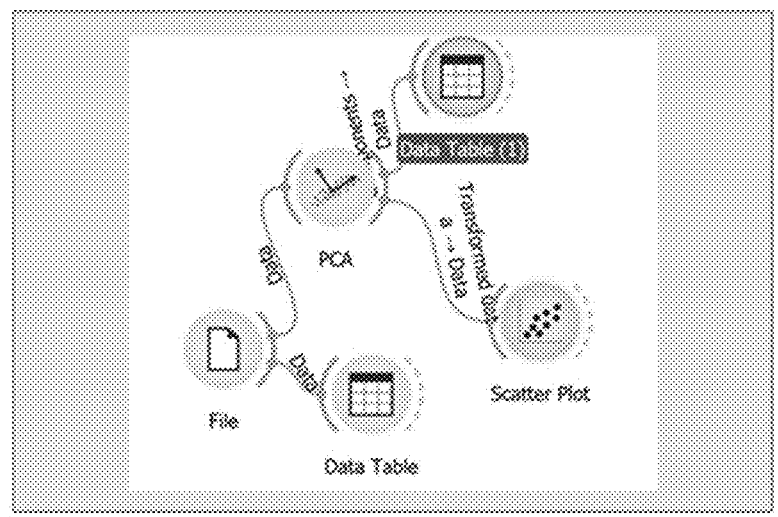
FIG. 3 represents the workflow setup to perform data mining of Image J results using Principal Component Analysis (PCA) in Orange.

According to the embodiments of the present invention, the feature Principal Component Analysis (PCA) of Orange was used to find the ratios of the mean RGB values. FIG. 3 shows the workflow set up in Orange in order to receive the results of the Principal Component Analysis (PCA). "Data Table" shows the data that has been entered into the PCA through the file, and "Data Table (1)" shows the ratio of each component (in this case, Red, Green and Blue) that has been used to get the trend that can be observed in the Scatter Plot widget.

Figure 4:
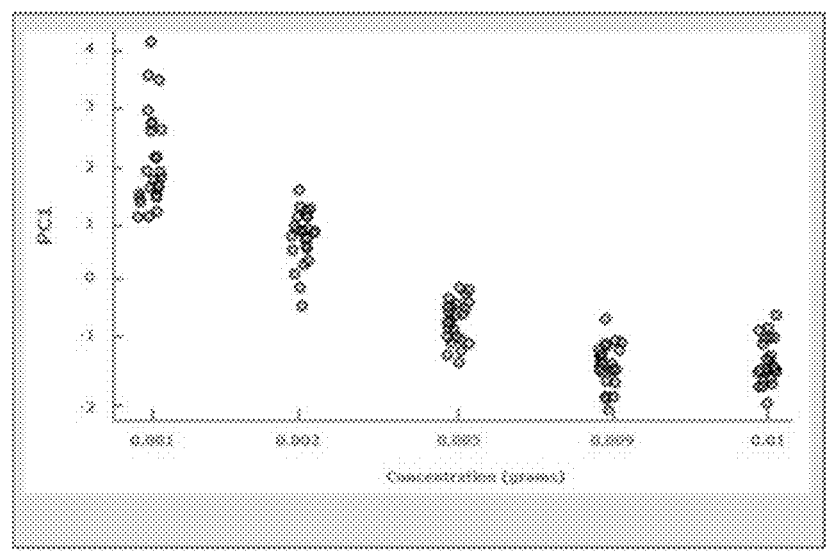
FIG. 4 shows the PCA value against Concentration.

FIG. 4 is a graph showing a calibration chart of PCA values against various concentrations of BPA. This graph is a calibration chart. If there is an unknown sample whose concentration is to be estimated, the PCA of the said sample is to be found and entered into Formula 1 of the calibration chart. This gives the concentration of the unknown sample.

It is to be understood, however, that the present invention would not be limited by any means to the samples or concentrations that are not specifically described, and any change to the materials, variations, and modifications can be made without departing from the spirit and scope described in the present invention.

I claim:

1. A method for estimating low levels of Bisphenol A (BPA) contained in a sample, said method comprising:
   a) taking a sample of an aqueous solution comprising BPA;
   b) dipping a filter paper in a mixture of ferric agent(s);
   c) adding a drop of the said aqueous solution comprising BPA;
   d) capturing the image of the filter paper using a mobile phone;
   e) uploading the image into than image processing software available on the mobile phone;
   f) processing the uploaded image to obtain the mean Red, Green and Blue (RGB) values of each image;
   g) using Principal Component Analysis (PCA) feature of a data mining tool for correlating the mean RGB values and concentration of BPA; and
   h) estimating the BPA concentration.

2. The method for estimating low levels of Bisphenol A (BPA) contained in a sample according to claim 1, wherein the ferric agent(s) are selected from the group comprising of potassium ferricyanide, ferric chloride, ferric nitrate, and combinations thereof.

3. The method for estimating low levels of Bisphenol A (BPA) contained in a sample according to claim 1, wherein the image processing software is a Java based image processing software.

* * * * *